July 19, 1932. J. A. ARENZ 1,867,796
SCREW MACHINE (MOVABLE LATCH)
Filed Dec. 18, 1930 4 Sheets-Sheet 1

Inventor
JOHN A. ARENZ
By His Attorney
John J. Lynch

July 19, 1932.  J. A. ARENZ  1,867,796

SCREW MACHINE (MOVABLE LATCH)

Filed Dec. 18, 1930   4 Sheets-Sheet 2

Inventor
JOHN A. ARENZ
By His Attorney
John J. Tipel

July 19, 1932.  J. A. ARENZ  1,867,796

SCREW MACHINE (MOVABLE LATCH)

Filed Dec. 18, 1930     4 Sheets-Sheet 4

Inventor
JOHN A. ARENZ
By his Attorney
John J. Lynch

Patented July 19, 1932

1,867,796

UNITED STATES PATENT OFFICE

JOHN A. ARENZ, OF MOUNT VERNON, NEW YORK, ASSIGNOR TO INTERNATIONAL SCREW COMPANY, OF WILMINGTON, DELAWARE, A CORPORATION OF DELAWARE

SCREW MACHINE (MOVABLE LATCH)

Application filed December 18, 1930. Serial No. 503,268.

This invention relates to screw cutting machines and in particular to one employing a double tool for the rapid and efficient production of screws.

A particular object of my invention is to provide in a screw cutting machine, thread cutting tools mounted in tandem and arranged to be fed and returned along the screw blank several times, at the end of the feed, the cutting edge of the tools being withdrawn from the blank so that they may be returned for the next cut.

A further object of my invention is to provide for a machine in which each succeeding cut or rather, alternate cuts made by the tools will be in different threads, that is, two tools advancing the first time along the blank will cut in the same threads but on the next cut, will both cut in the same threads but the thread will be different thread than that first worked on and will lie alternately between the convolutions of the first thread. In other words, in cutting a double thread screw, the tools on the first advance will form one of the threads and on the second advance will form the other thread and in accordance with the mechanism employed in my machine, it makes no difference which thread is cut first, two cuts being employed on the machine or more, if necessary, in order to complete the screw.

A still further object of my invention is to provide a machine in which the tools operating in the same thread cut the blank faster and thereby produce a double thread screw much faster and more efficiently than has heretofore been possible, the reason for this being that the double tool cutting in the one screw groove, effectively completes its cut in that groove before starting the cut of the other groove which forms the double thread screw.

Another and equally important object of my invention is the provision of a threading machine which is simple and efficient in operation, which is cheap to manufacture, which is composed of a minimum number of parts so that efficiency in operation is very materially increased and also one which is particularly adapted to take care of the operation of the double cutting tool.

To enable others skilled in the art to fully comprehend the underlying features of my invention that they may embody the same in the various modifications in structure and relation contemplated, drawings depicting a preferred form has been annexed as a part of this disclosure and in such drawings, similar reference characters denote corresponding parts throughout all the views, of which, Figure 1 is a view in side elevation of a machine constructed in accordance with my invention.

Figure 1:
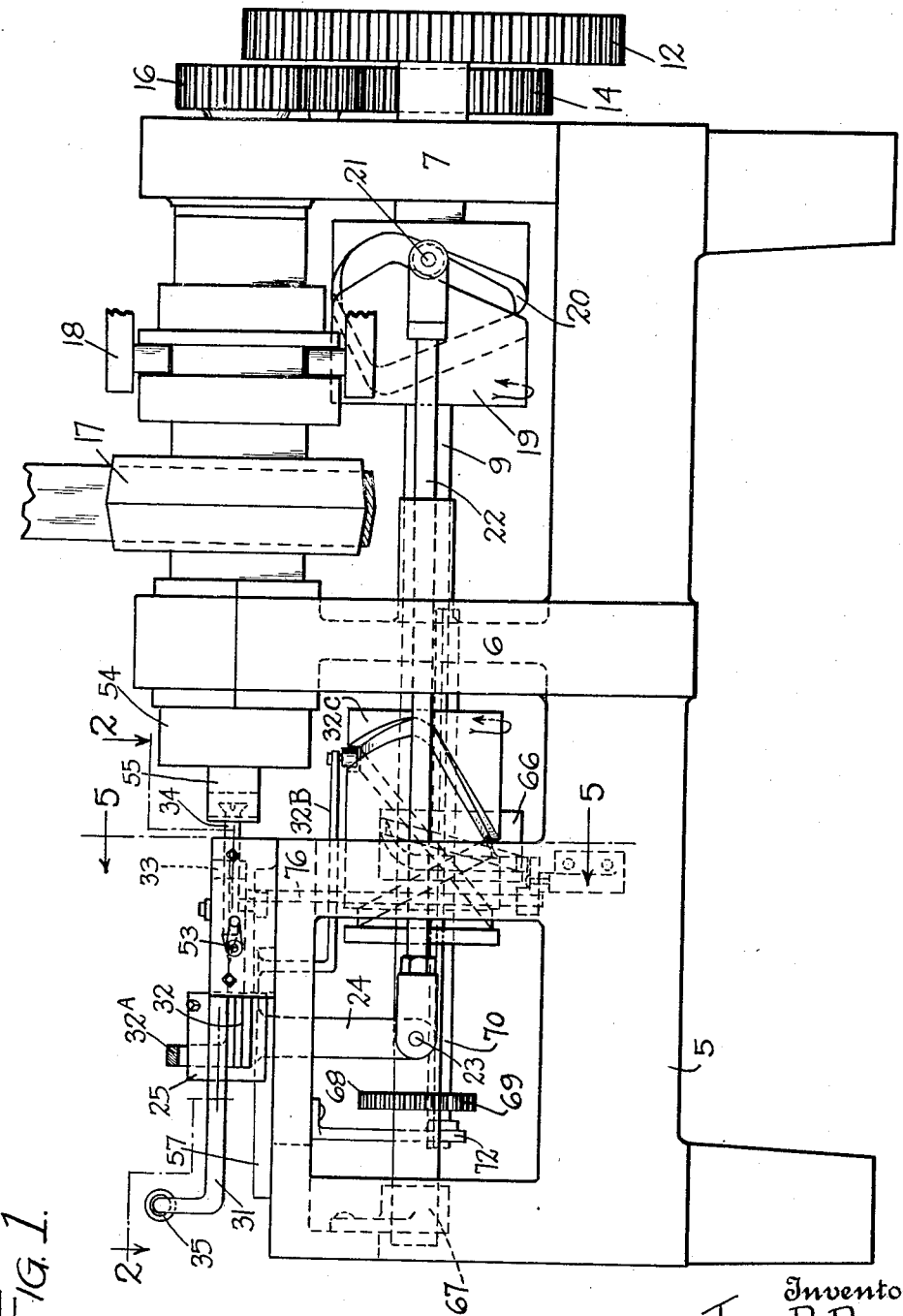
Figure 2:
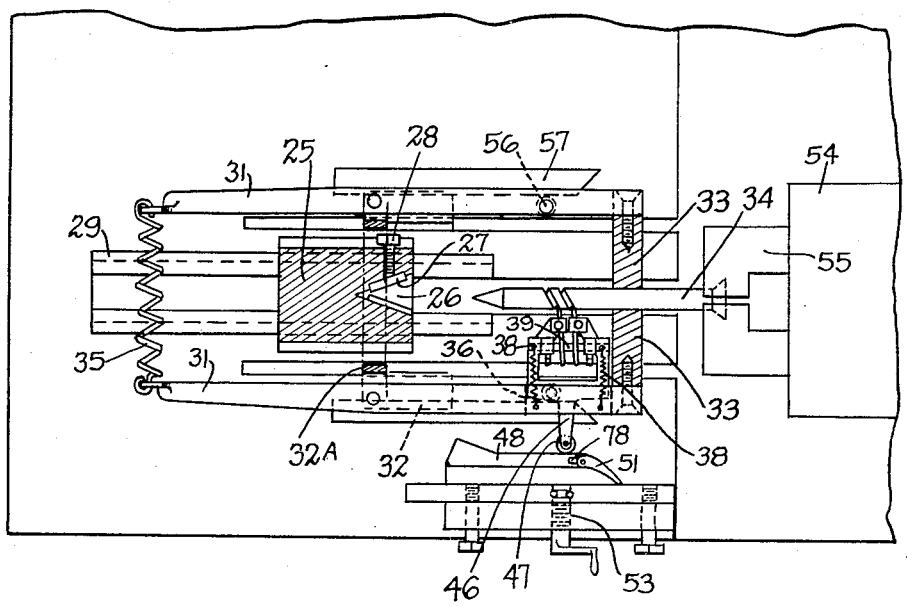
Figure 2 is a top plan view of the front end of the machine illustrating the method of pointing the screw blank and also of threading the same.
Figure 3:
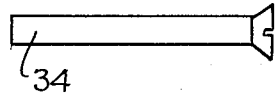
Figure 3 is a view of a screw blank which is operated upon by the machine.
Figure 12:
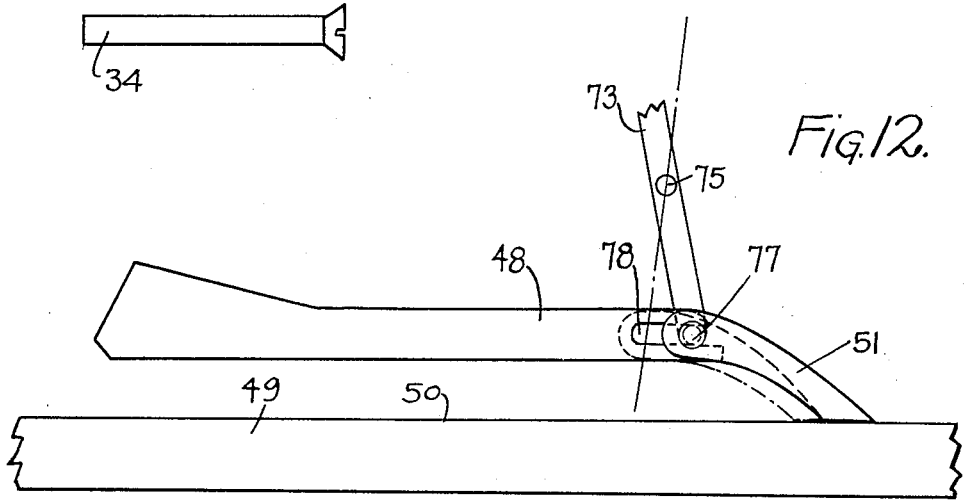
Figure 10:
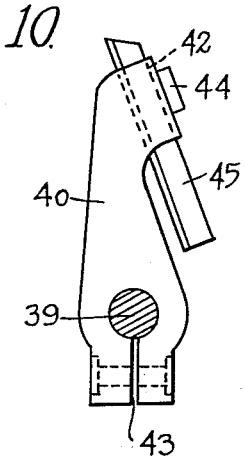
Figure 10 is a view in side elevation of the tool holder and tool employed in the machine.
Figure 11:
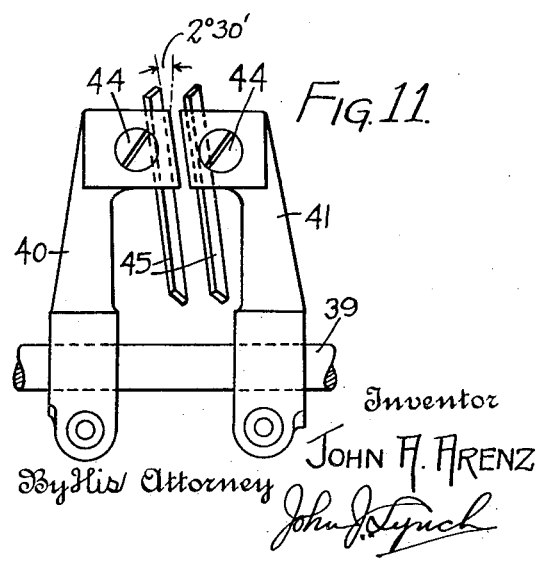

Figure 11 is a view of the tools and double tool holders taken at right angles to the view shown in Figure 10, the tools being shown in perspective and in the position they will assume during the cutting operation, and Figure 12 is a top plan view of the latch member which performs a double function in the machine, that of advancing the tools toward the work and starting the tools cutting the work at different points on alternate strokes.

Figure 4:
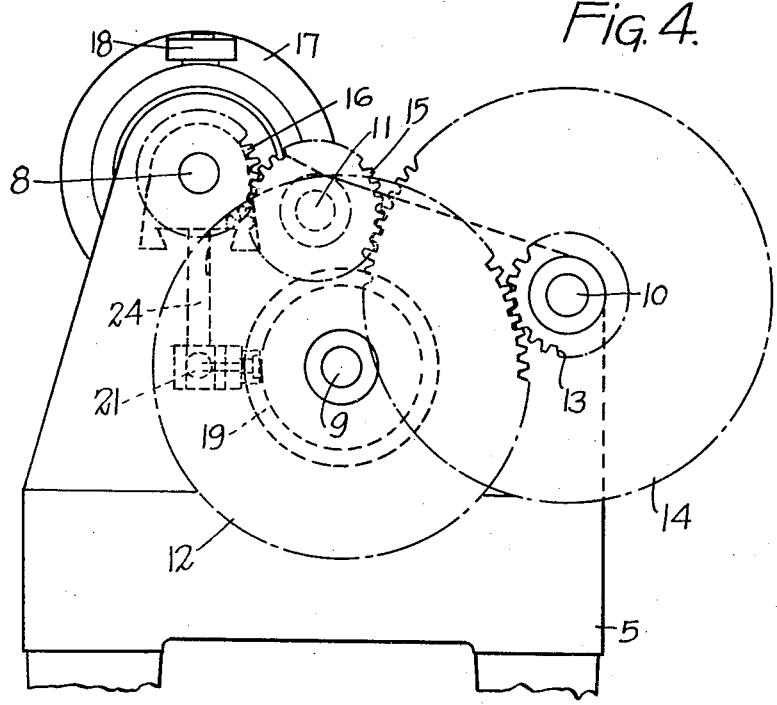
Figure 4 is an end elevation of the right hand end of the machine showing the gearing used in operating the same.
Figure 5:
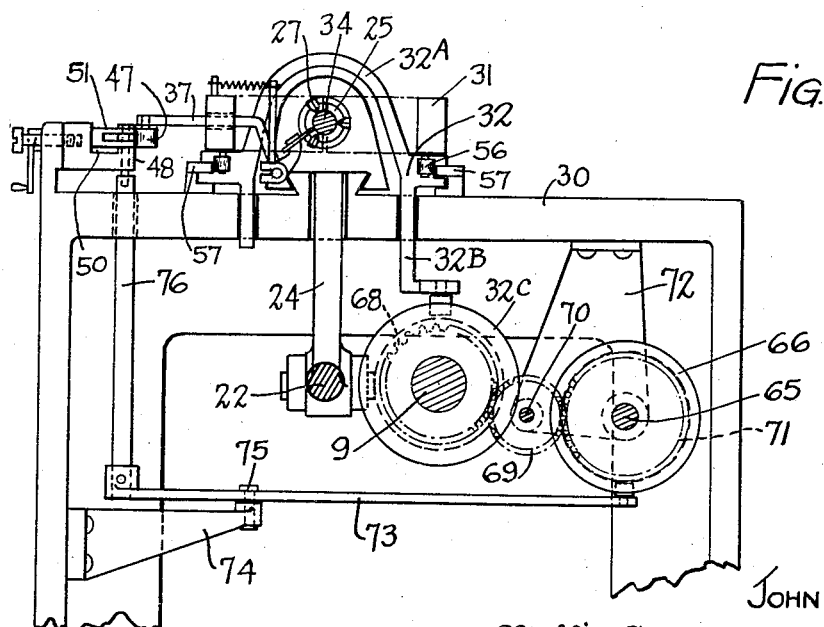
Figure 5 is a section taken on the line 5—5 of Figure 1 and illustrating the blank pointing device and cams for operating the various members.

Referring to the drawings in detail, 5 indicates the frame of the machine which is cast to provide the journal supports 6 and 7, in the latter of which are held the shafts 8, 9, 10 and 11, the shafts 8 and 9 being through shafts which are supported in the portion 6, the shaft 9 being provided at its end beyond the support 7 with the gear 12 which is driven by the pinion 13, see Figure 4, mounted on the stub shaft 10, there being also carried by the shaft, the gear 14 which meshes with and is driven by the gear 15 carried on the stub shaft 11. This gear 15 transmits the motion of the drive gear 16 to the gear 14 before mentioned, the drive gear 16 being mounted on the shaft 8 which carries the drive pulley 17 through the medium of which said shaft is operated. The shaft also carries a suitable clutch 18 so that operation of the pulley is possible without driving the mechanism. The gear 12 being secured on the end of the shaft 9, operates the same to revolve the cam 19 carried on said shaft, the cam being provided with a suitable cam path 20 in which operates the roller 21 to impart to the arm or cam shaft 22, the proper motion for pointing the end of the screw blank. The end of the cam shaft 22 is secured as at 23 to a depending member 24 which is cast integral with a pointing head 25. This pointing head has a conical opening 26 in one end thereof in which is positioned the cutters 27 which are secured therein through the medium of the set screws 28. The pointer head 25 travels on the under cut track 29 formed on the surface of the table 30 cast integral with the face 5 of the machine.

A tool carrying frame consisting of bridged slides 32 and arms 31, pivotally secured to the slides, is provided. The bridge is indicated by the numeral 32—A, and the arms 31 are formed at one end to provide jaws 33 between which the screw blank 34 is held or supported, inasmuch as these jaw members 33 slide freely along the shank 34, the sliding movement being imparted by reason of the fact that the arms 31 are mounted on the connected slides 32, which slides constitute a slide frame having a dependent cam arm 32—B which engages the cam 32—C to impart to the slide frame, a suitable oscillatory motion.

Figure 6:
Figure 6 is a view showing the formation on a screw blank of a double thread, barbed, single point, drive screw which may be cut by the tools employed in the machine.
Figure 7:
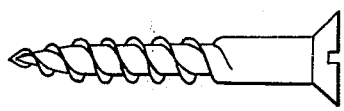
Figure 7 is a view of a double thread speed screw of the single point type which may also be cut in my improved machine with the use of the double tools.
Figure 8:
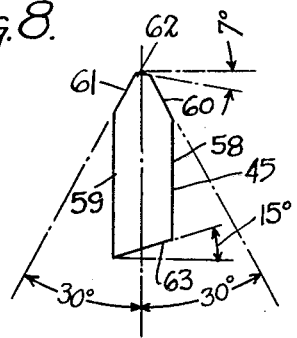
Figure 8 is an end elevation of my improved cutter illustrating the contour and shape of the tool in its cross sectional area.
Figure 9:
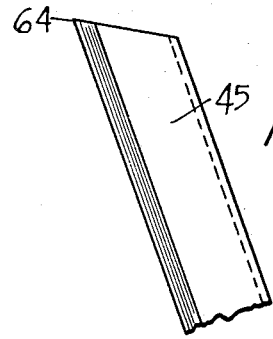
Figure 9 is a view in side elevation of the cutting tool illustrated in Figure 8.

The arm 31 at the side nearest the operator of the machine is provided with an opening 36 in which slides the tool holder 37, this tool holder comprising the spaced arms 38 which support at their ends the shaft 39 upon which are mounted the tool holders 40 and 41. These tool holders are split in their upper and lower portions as at 42 and 43 respectively and through the medium of suitable bolts, are clamped to the shaft 39 and through the medium of the set screws 44 are pinched at their upper ends to support in proper position the cutting tools 45. It will be noted that the upper end of the tool holder 41 is turned opposite in the direction that the upper end of the tool holder 40 is, this being so in order that the tool 45 carried thereby may be disposed in exactly the same position as the tool 45 carried by the tool post 40. These tools operate upon the screw blank 34 to cut therein either type of thread as illustrated in Figures 6 and 7 and at the start of the cutting operation, for instance, both tools will operate one behind the other to cut one of the thread grooves completely down to the tip of the screw blank. When this has been accomplished, the tool head will be returned and it will cut an intermediate thread groove to provide a double threaded blank.

The cutting of the intermediate thread groove is accomplished by means of a movable latch, the construction and operation of which will be hereinafter described, but it is to be borne in mind that both of the tools travel and cut first, one of the threads and on the return travel, cut the intermediate thread and then again, on the third stroke, cut the first formed thread and on the fourth stroke, cut the intermediate thread, these operations being repeated any number of times from twice to the number of times necessary to completely thread the blank 34. If desired, one of the tools 45 may be slightly advanced in the holder so that it will take a deeper cut during the threading operation. In other words, the first tool to engage the blank, will cut a groove not quite as deep as the one cut by the second tool of the holder, which engages in the same groove, as does the first tool.

The tool frame 37 or holder is provided with an extension 46 which carries a roller 47, this roller riding on the cam surface 48 which conforms substantially to the outline of the shape of the blank 34. It is quite evident that when the frame 32 is drawn back, the roller will ride up on the inclined portion of the cam 48 and the entire blank will be threaded down to the very tip. When the roller, however, rides over the end of the cam 48, the springs 38 will pull the holder back away from the blank and will cause the roller 47 to strike against the return plate 49 and the return stroke of the frame 32 will cause the roller to ride along the surface 50 until it passes out through the latch 51 which is hinged to the cam 48. A threading movement, therefore, of the frame piece 32 will cause the roller to ride up on the outside of the latch 51 thus bringing the tools toward the blank 34 and commencing the threading operation.

The cam shaft 9 which carries the cams 19 and 32—C is journalled at one end in a suitable bracket 67 and carries a drive gear 68 which, through the medium of the intermediate pinion 69 mounted on the countershaft 70 drives the gear 71 mounted on the auxiliary cam shaft 65. Both the shafts 65 and 70 are journalled in the frame of the machine at one end and in a suitable bracket 72 at the opposite end. The shaft 65 carries the latch operating cam 66 in the path of which is engaged a suitable roller carried on the end of a lever 73 journalled as at 75 in the bracket 74 and carrying the vertically disposed rod 76, the upper end of which has secured thereto the pin 77 to which the latch 51 is pivoted. This pin 77 is arranged for oscillating movement in the end notch 78 of the cam 48 and when it moves to and fro, it carries the latch from its full line position, as illustrated in Figure 12 to the outline position and the contour of the edge of the latch is such that when it is in the full line position, the roller 47 of the tool holder 46 will cause a movement of the tools against the screw blank at a point in advance of the point that the tools would engage the blank if the latch was moved to the position illustrated in outline with the result that on each return of the tool to start a new cutting movement, the latch will be moved from one position to the other, so that alternate cuts of the tools will be made in alternate grooves of the screw, or in other words, two of the tools will travel down the screw blank and form one complete thread and on the next cutting operation of the tools, the same will travel down the intermediate groove to form the double thread or second thread on the blank. The cam 32—C is provided with a suitable cam slot that affords the proper timing movement of reciprocating nature to the depending arm 32—B forming a part of the bridge slide structure. The cams 32—C and 66 are geared to operate two complete revolutions to one complete revolution of the cam 19.

The cam 48 and its return portion 49 are formed as a single unit and are suported in connection with an upstanding portion 51 through the medium of the screws 52. These screws 52, while supporting the cam piece 48, permit its adjustment relatively to the support 51 through the medium of the adjusting screw 53 provided with a suitable machine handle so that the tools can be adjusted to cut more deeply upon each succeeding return of the tool holder. If desired, the entire cam 48 unit may be adjusted longitudinally in any well known manner to provide for the handling by the machine of screw blanks of different lengths.

The bringing of the tools close to the work so that the thread is cut more deeply may be carried out automatically in any well known manner through the use of cams, it being sufficient to note that the tools may be brought nearer the work upon each succeeding cut so that the threads can be rapidly and completely formed if more than one cut is necessary. The free end of the shaft 8 carries a suitable chuck head 54 in which the chuck jaws 55 operate to hold the blank 34 in position to be operated upon.

The arms 33 of the pointer head frame are provided with rollers 56 which operate against the cam flanges 57 formed on the table 13 to provide for the automatic operation of the jaws 33 to support the blank.

It is evident that in a machine of this character that the threads of either the type shown in Figures 6 and 7 may be effectively cut with the tools and the cutting tools have a pair of parallel sides 58 and 59 with a pair of angularly disposed portions 60 and 61 disposed at an angle of 30 degrees to the longitudinal axis of the cutting tool 45, the same angular portions terminating along the sides 58 and 59 and joining the forward cutting sides 62 of the tool which is disposed at an angle of 7 degrees to the transverse axis of the cutting tool. The rear side 63 of the tool is disposed at an angle of 15 degrees to the transverse axis of the tool so that when the tool is placed in the holder, it is tilted sidewise at an angle of 15 degrees to the transverse axis of the tool and forwardly at an angle of 20 degrees to the vertical due to the angle of the tool seat which is inclined 2 and one-half degrees with respect to the transverse axis of the screw blank and which is also turned at an angle of 15 degrees to the transverse axis of said screw blank so that the forward cutting edge 64 of the tool produces with the final cut on the screw blank, the valley on the screw.

It is quite evident that the combination of two of these tools along side each other, operating in the same groove and one slightly more advanced to cutting depth than the other, will efficiently and quickly complete the cutting of a thread on the screw through the medium of the automatic operation of the machine.

It will be understood that the pointing and cutting of each thread groove of the screw blank is performed in successive operations, the pointing being performed first and the threading afterward in a plurality of operations but with the use of two tools. The production of the screw is much faster than has heretofore been possible in method and machines commonly employed.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States patent is:—

1. A screw pointing and threading machine comprising in combination, a movable slide, a cam for reciprocating said slide in a feed and return movement, a tool holder carried at one side of said slide and having an extension, a guide cam having a feed path and a return surface thereon along both of which the extension moves, means for forcing the extension off the feed surface path at the end thereof and on to said return surface, a yieldable latch gate at the end of said return surface through which the extension passes for shunting the extension on to said feed path upon a feed movement of said slide, and means for reciprocating said latch longitudinally of said feed surface, at alternate reciprocations of the slide.

2. A screw pointing and threading machine comprising in combination, a movable slide, a cam for reciprocating said slide in a feed and return movement, a tool holder carried at one side of said slide and having an extension, a guide cam having a feed path and a return surface thereon along both of which the extension moves, means for forcing the extension off the feed path at the end thereof and on to said return surface, a yieldable latch gate at the end of said return surface through which the extension passes for shunting the extension on to said feed path upon a feed movement of said slide, an arm to which said latch is pivoted, and a cam for moving said arm to cause reciprocation of said latch longitudinally of said feed surface at alternate reciprocation of said slide.

3. A screw pointing and threading machine comprising in combination, a movable slide, a cam for reciprocating said slide in a feed and return movement, a tool holder carried at one side of said slide and having an extension, a guide cam having a feed path and a return surface thereon along both of which the extension moves, means for forcing the extension off the feed surface at the end thereof and on to said return surface, a yieldable latch gate at the end of said return surface through which the extension passes for shunting the extension on to said feed path upon a feed movement of said slide, means for reciprocating said latch longitudinally of said feed surface at alternate reciprocations of said slide, and a plurality of threading tools carried in said tool holder and arranged to cut one thread at a time of a double threaded screw blank during a feed movement of said slide.

4. A screw pointing and threading machine comprising in combination, a movable slide, a cam for reciprocating said slide in a feed and return movement, a tool holder carried at one side of said slide and having an extension, a guide cam having a feed path and a return surface thereon along both of which the extension moves, means for forcing the extension off the feed surface at the end thereof and on to said return surface, a yieldable latch gate at the end of said return surface through which the extension passes for shunting the extension on to said feed path upon a feed movement of said slide, an arm to which said latch is pivoted, a cam for moving said arm to cause reciprocation of said latch longitudinally of said feed surface at alternate reciprocations of said slide, and a plurality of threading tools carried in said tool holder and arranged to cut one thread at a time of a double threaded screw blank during a feed movement of said slide.

In testimony whereof I affix my signature.

JOHN A. ARENZ. [L. S.]